TARGET AT 125 METERS
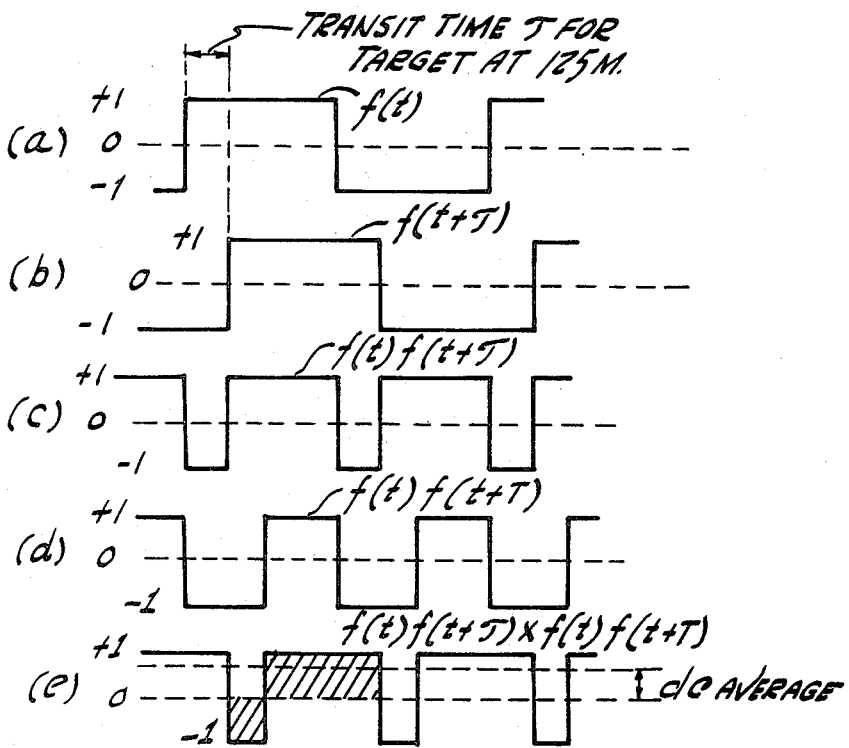
TARGET AT 250 METERS
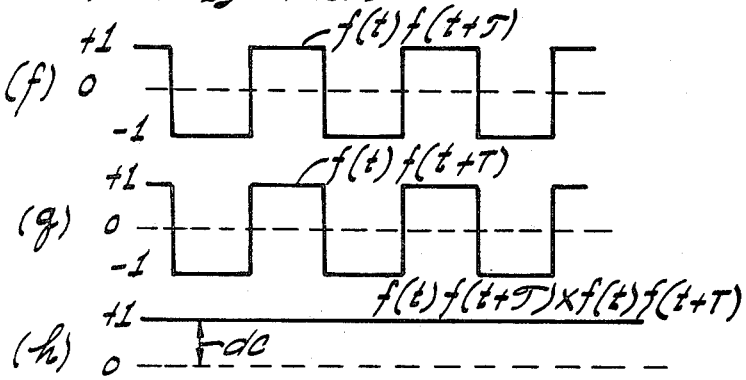
Fig. 4.

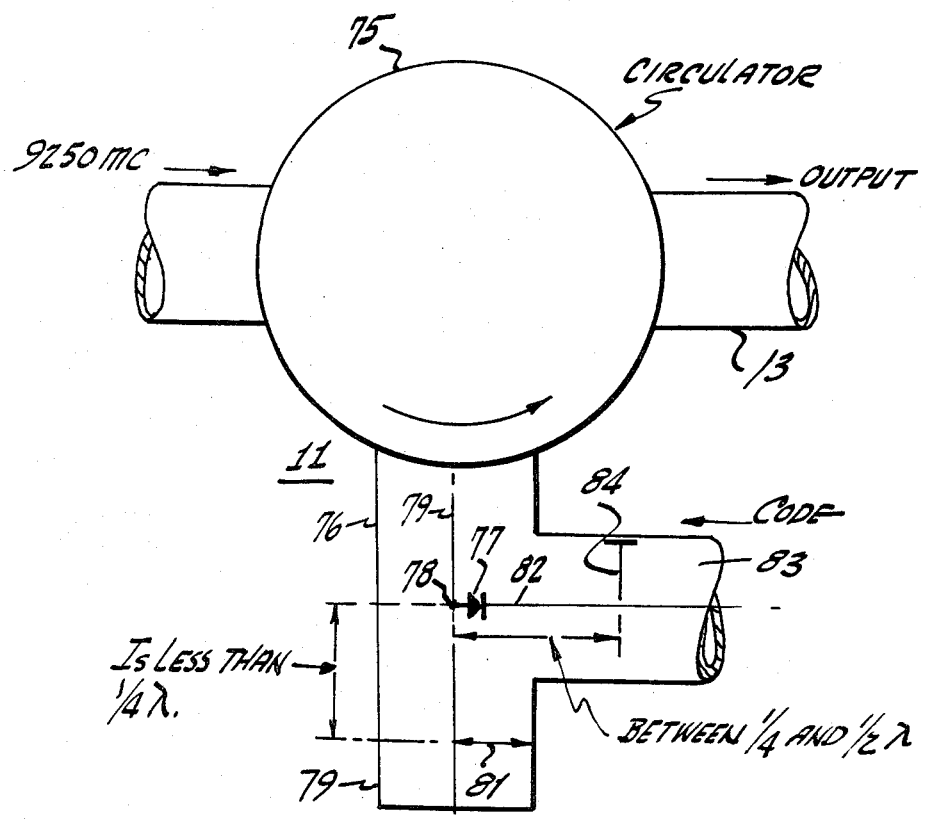

United States Patent Office 3,386,094
Patented May 28, 1968

3,386,094
AMPLITUDE MODULATION CANCELLATION FOR PHASE MODULATED CORRELATION SYSTEM
Dale L. Kratzer, Trevose, Pa., and George J. Armbruster, Cherry Hill, N.J., assignors to Radio Corporation of America, a corporation of Delaware
Filed Oct. 24, 1966, Ser. No. 588,831
5 Claims. (Cl. 343—17.5)

ABSTRACT OF THE DISCLOSURE

A Doppler type correlation radar system wherein a continuous wave carrier is phase modulated by a desired code and in which undesired incidental modulation, particularly incidental amplitude modulation, is cancelled.

This invention relates to amplitude modulation cancellation, and particularly to means for cancelling amplitude modulation that occurs incidental to the production of a desired modulation such as phase modulation.

The invention will be described as embodied in a Doppler type correlation radar system designed particularly for detecting and locating moving targets such as enemy soldiers or vehicles that are moving under cover of darkness or under cover of a forest, for example. In this embodiment the radar transmits a continuous wave carrier that is phase modulated by a code. In this embodiment the code varies in amplitude from +1 to —1, for example, and shifts the phase of the carrier wave 180 degrees each time the code changes from +1 to —1 or vice versa. Some amplitude modulation of the carrier wave may be produced during this phase modulation, the amount of amplitude modulation depending upon the design and construction of the phase modulator. Such amplitude modultaion should be prevented from appearing in the Doppler output signal because its presence appears as noise that tends to obscure the Doppler signal.

With the radar system here described, the radar operator hears a Doppler signal if the target is moving, the character of the signal heard being characteristic of the particular target and its speed, and the Doppler signal is so free from noise signal that it is readily heard without being confused or drowned out by noise.

An object of the invention is to provide an improved amplitude modulation cancellation circuit.

A further object of the invention is to provide an improved amplitude modulation cancellation circuit for a correlation system that supplies a Doppler signal which is readily heard above any noise that may be present.

A still further object of the invention is to provide an improved receiver mixer circuit that cancels out undesired amplitude modulation of the received carrier but passes the desired modulation of another type such as phase modulation.

In the embodiment of the invention which will be described the radar carrier wave to be transmitted is phase modulated by a code which repeats at a comparatively high frequency. As will be described, the radar system operates either in an "all range" mode for which the code is a square wave, or in a "range bins" mode for which the code is a pseudo-random code. Each code changes in amplitude, the change being from +1 to —1 in the present example. When the code changes from +1 to —1 or from —1 to +1, the radar carrier is shifted 180 degrees in phase, i.e., the phase of the carrier is reversed. With this type of modulation, the pseudo-random code may contain a comparatively small number of bits (1023 bits in this example) so that it is practical to design a system in which the pseudo-random code repeats at a comparatively high frequency (at a frequency of approximately 6000 per second in this example). Thus the repetition rate of the pseudo-random code is readily selected to be at least twice the frequency of the highest frequency of the Doppler signal for which the operator listens. The square wave code for "all range" operation has a still higher repetition rate when its quarter-wave period is selected to equal the radar transit time for a target at maximum range as will be discussed later. In the present example the square wave code has a frequency of 150,000 cycles per second. Because of these high repetition rates of the codes it is comparatively easy, as will be discussed later, to filter out the noncorrelated signal from the Doppler signal heard by the radar operator. In the present example, the highest Doppler frequency passed to the operator's earphones is 1500 cycles per second. The Doppler signal is free from noise caused by amplitude modulation because such modulation has been cancelled out.

The invention will be described in detail with reference to the accompanying drawing in which:

FIGS. 3 and 4 are groups of graphs that are referred to in explaining the "all range" mode of operation of the system shown in FIG. 1; and FIG. 5 is a diagram of a suitable phase modulator that may be used in the system of FIG. 1.

In the several figures like parts are indicated by similar reference characters.

Figure 1:
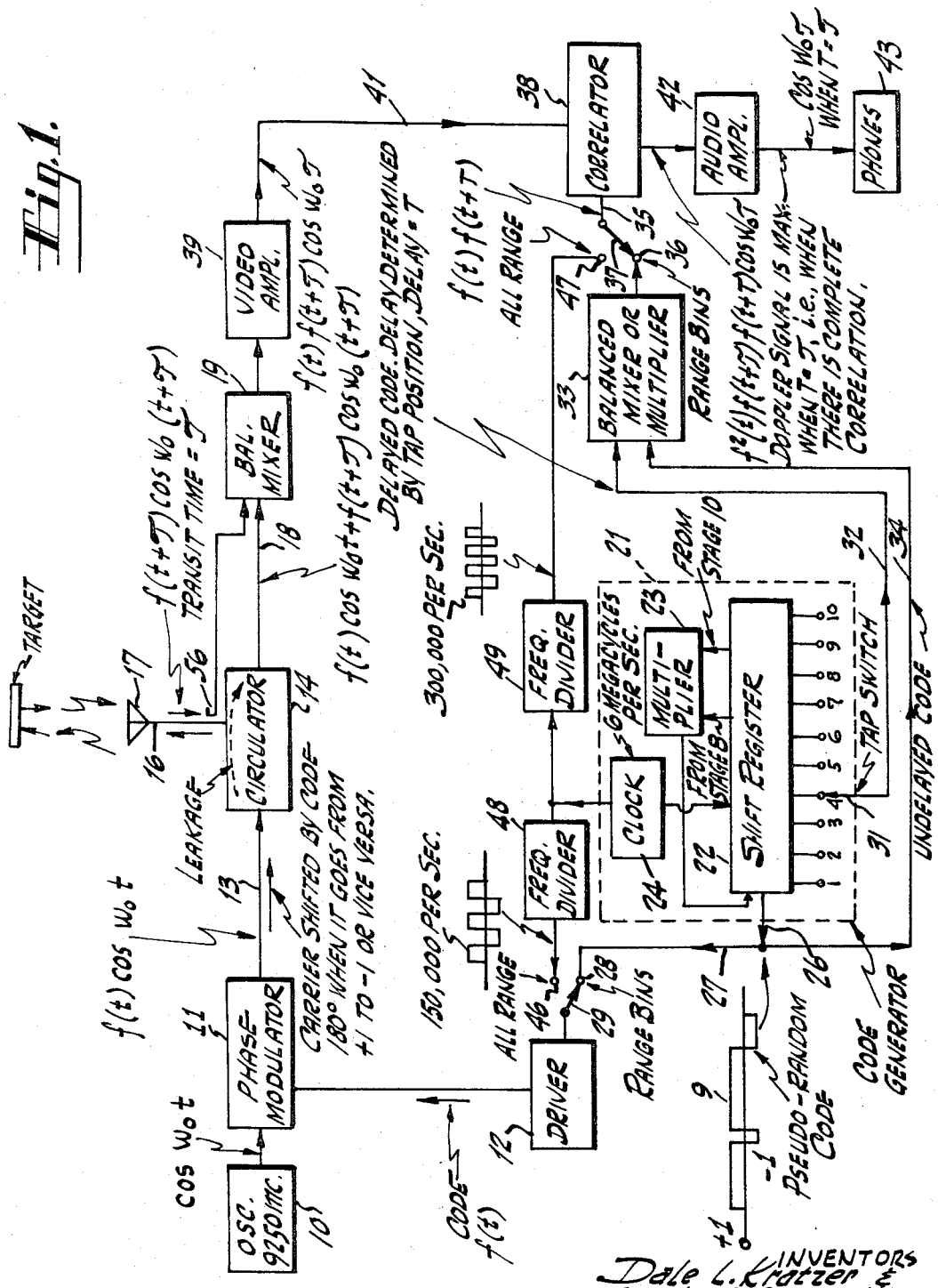
FIG. 1 is a block diagram of a radar system embodying the invention.
Figure 2:
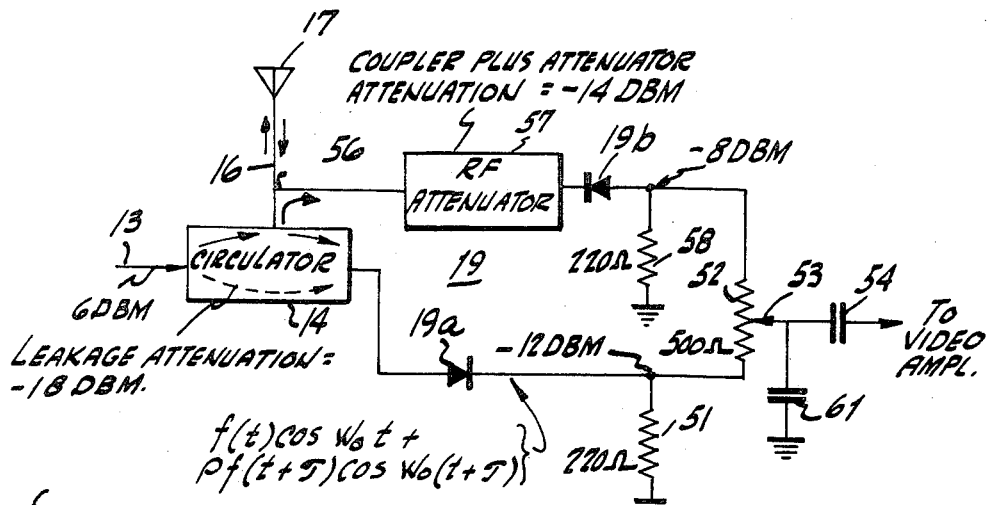
FIG. 2 is a circuit diagram of the receiver mixer of FIG. 1 and the associated circuit for balancing out amplitude modulation from the phase modulated carrier.

Before the invention, illustrated by way of example in FIG. 2, is described, the correlation system of FIG. 1 which includes the invention will be described.

Referring to FIG. 1, the radar carrier wave is generated by an oscillator 10 which supplies the carrier to a phase modulator 11. The carrier wave is designated cos $\omega_0 t$.

The oscillator 10 may supply a carrier having a frequency in the X band, or having a lower frequency if preferred. If in the X band, the unit 10 may be a stable oscillator that feeds into a non-linear device to generate harmonics; a high frequency harmonic being sharply filtered to pass a very clean X band carrier signal (a 9250 megacycle per second signal, for example) to the phase modulator 11.

At the phase modulator 11 the carrier is 180-degree phase modulated by a code supplied from a driver 12. This code is designated $f(t)$. A specific example of a suitable phase modulator will be described later. The phase modulated carrier is supplied over a transmission line 13 to the first port of a three-port circulator 14, and passes out of a second port over a transmission line 16 to a transmitting and receiving device comprising an antenna 17 which preferably is directional. The phase modulated signal from the modulator 11, which is the signal transmitted, may be written $f(t)$ cos $\omega_0 t$. As has been stated, this signal may contain some undesired amplitude modulation which, as later described, is cancelled out. The carrier may be said to be modulated in accordance with a desired function (phase modulation) and in accordance with an undesired function (amplitude modulation). Some of the signal from the phase modulator leaks through the circulator to the third port and feeds through a transmission line 18 and feeds with reflected signal, as discussed below, into a receiver mixer 19. The mixer 19 includes a balanced circuit, which will be described later with reference to FIG. 2, for balancing out any amplitude modulation.

Reflected signal from a target is picked up by the antenna 17. The round trip time of the radio wave transmitted to a target and reflected back to the radar set is designated $\tau$. Therefore, the reflected signal picked up by the antenna is $\rho f(t+\tau) \cos \omega_0(t+\tau)$ where $\rho$ is an attenuation constant. The reflected signal feeds over the line 16 to the circulator 14 where it adds to the leakage reference signal. This sum signal feeds from the third port through the line 18 into the mixer 19 where the sum signal $f(t) \cos \omega_0 t + \rho f(t+\tau) \cos \omega_0(t+\tau)$ is squared.

The transmission lines 13, 16 and 18, as well as the lines interconnecting other units of the system, may be coaxial lines, for example.

The "range bins" mode of operation and the circuit for this operation will now be described, together with the theory of operation which also applies to the "all range" mode. The pseudo-random code is fed to phase modulator 11. It is generated by a pseudo-random code generator 21 known in the art. The code is illustrated schematically by the graph 9. It changes in amplitude from $+1$ to $-1$. If preferred, the code amplitude may be made to change in amplitude from $+1$ to $0$, for example. The code generator illustrated comprises a 10-bit or 10-stage shift register 22 that feeds signal from stage 8 and from stage 10 to a multiplier 23. The multiplier output feeds back to stage 1 of the shift register. The shift register is driven by a clock 24 or master oscillator operating at 6 megacycles per second. In this example, the code is 1023 bits long before it repeats, there being one bit for each pulse from the clock. Therefore, the code repeats at a comparatively high frequency which is equal to the clock frequency divided by the number of bits in the code. Thus the pseudo-random code repetition frequency is $6,000,000/1023=6000$ per second approximately. The pseudo-random code is taken off the first stage of the shift register and supplied over lines 26 and 27, and through switch contact 28 and switch arm 29 to the driver 12 when the switch arm 29 is in what is referred to as the "range bins" position. The driver 12 may be an amplifier or any suitable circuit for increasing the amplitude of the code sufficiently for operating the phase modulator 11.

The code is also taken off the shift register by way of one of the ten taps marked 1 to 10 and a tap switch 31. The taps 1 to 10 take signal off shift register stages 1 to 10, respectively. At tap 1 the code is delayed with respect to the undelayed code on line 26 by an amount equal to the transit time of the radar signal traveling to a target 25 meters from the radar and returning to the radar. The code appearing on tap switch 31 is delayed an additional amount each time it is moved to a higher number tap, the delay from one tap to the succeeding tap being equal to the radar transit time to and return for a target 25 meters from the radar. Thus, at tap 10, for example, the code delay is equal to the transit time of the radar signal going to and returning from a target 250 meters from the radar set. The amount the code is delayed is designated T.

The delayed code $f(t+T)$ from the tap switch 31 is supplied over a line 32 to a balanced mixer or multiplier 33. The undelayed code $f(t)$ is supplied over a line 34 to the multiplier 33 also. The unit 33 may be any suitable device or circuit that multiplies the two input signals to give the product signal $f(t)f(t+T)$. This product signal appearing at the output of mixer 33 is supplied by way of a contact point 36 and a switch arm 37 over a line 35 to a correlator 38 when the switch arm is in the "range bins" position.

The output of the receiver mixer 19 is supplied through a video amplifier 39 and a line 41 to the correlator 38. As will be explained later, the signal fed to the correlator by line 41 is the product of the delayed code $f(t)$, the transit time delayed code $f(t+\tau)$, and a component $\cos \omega_0 \tau$ representing Doppler signal due to target movement. That is, the signal on line 41 is $f(t)f(t+\tau) \cos \omega_0\tau$. This is the same signal as the reference signal $f(t)f(t+T)$ supplied to the correlator over the line 35 when T equals $\tau$, except for the Doppler component.

The output of the correlator 38 is supplied to an audio amplifier 42 which passes audio signal up to 1500 cycles per second in the present example. This is the Doppler signal $\cos \omega_0\tau$ which appears as the correlator output when the tap switch 31 is set on a shift register tap that supplies code that is delayed by substantially the same amount as the received radar signal, that is, when the code delay T equals or substantially equals the radar signal delay $\tau$.

The output of audio amplifier 42 is supplied to a utilization device such as earphones indicated at 43. In operating the radar, the operator listens to the earphones, points the antenna in the direction of a suspected moving target, and moves the tap switch 31 to the particular tap that results in the maximum amplitude signal in the earphones, assuming the radar signal strikes a moving target so that a Doppler signal is obtained. This particular tap gives the range of the target, the taps 1 to 10 representing ranges of 25 meters, 50 meters, etc., up to 250 meters, respectively. The direction of the target is indicated by the direction in which the directional antenna is pointing.

The reason that the signal $f(t)f(t+\tau) \cos \omega_0\tau$ appears on the lead 41 will now be explained. First, reference is made to FIG. 2 which shows a balanced mixer circuit 19 designed in accordance with the present invention. The diode 19a is the one of present interest, the diode 19b being for balancing out any amplitude modulation that may be present as will be described later. The diode 19a is provided with a load resistor 51, the upper end of which is connected to a summing resistor 52 (summing for amplitude modulation cancellation). A tap 53 supplies the output of diode 19a (less amplitude modulation) through a coupling capacitor 54 to the video amplifier 39.

The sum signal or current $e$ from the circulator is $f(t) \cos \omega_0 t + \rho f(t+\tau) \cos \omega_0(t+\tau)$. This is squared by the diode 19a. The current output of diode 19a is $e^2 = f^2(t) \cos^2 \omega_0 t + 2\rho f(t)f(t+\tau) \cos \omega_0 t \cos \omega_0(t+\tau) + \rho^2 f^2(t+\tau) \cos^2 \omega_0(t+\tau)$ Since the trigonometric identity $\frac{1}{2}(1+\cos 2\omega_0 t)$ may be substituted for $\cos^2 \omega_0 t$ and a substitution also may be made using the trigonometric identity $\cos A \cos B = \frac{1}{2} \cos(A+B) + \frac{1}{2} \cos(A-B)$ and since $f(t)$ is either $+1$ or $-1$ whereby $f^2(t)$ is always $+1$ and $f^2(t+\tau)$ is always $+1$, $e^2$ may be written as follows:

$e^2 = \frac{1}{2} + \frac{1}{2} \cos 2\omega_0 t + \rho f(t)f(t+\tau) \cos(2\omega_0 t + \omega_0\tau)$
$\quad + \rho f(t)f(t+\tau) \cos \omega_0\tau + \frac{1}{2}\rho^2 + \frac{1}{2}\rho^2 \cos 2\omega_0(t+\tau)$ The corresponding voltage V appearing at the tap 53 is a constant C times $e^2$. The voltage appearing at the output of the video amplifier 39 is only the amplified component $C\rho f(t)f(t+\tau) \cos \omega_0\tau$ because the other components of the squared signal are either direct current components or components having a frequency twice that of the X band carrier frequency, none of which is passed by the video amplifier. Thus, the signal supplied over the line 41 to the correlator is $f(t)f(t+\tau) \cos \omega_0\tau$ (times a constant) as previously stated.

This video amplifier output signal on line 41 should be regarded as containing Doppler because $\tau$, the round trip time, is not a fixed constant number if the target is moving; in fact is a function of time, that is, the round trip time from the antenna to the target and back will differ from time to time. Therefore, we may write $\tau(t)$ which is contained in the phase of the cosine term as a power series function, and expand it to write $\tau(t)$ as a constant term designated $\tau_0$ (a fixed quantity) plus a linear term which may be written $\dot{\tau}_0 t$. Thus we may express $\tau(t)$ as a constant time plus a linear function of time plus higher order terms as follows:

$\tau(t) = \tau_0 + \dot{\tau}_0 t + \frac{1}{2}\ddot{\tau}_0 t^2 + \ldots$

We are only concerned here with the Doppler itself which is the linear portion $\dot{\tau}_0 t$.

The reference signal applied over line 35 to the correlator is $f(t)f(t+T)$. Since a correlator multiplies the two applied signals, its output is $$f^2(t)f(t+\tau)f(t+T) \cos \omega_0 \tau$$

When the tap switch 31 is set so that $T=\tau$, this output is $f^2(t)f^2(t+\tau) \cos \omega_0 \tau$. Since $f^2(t)$ and $f^2(t+\tau)$ are each equal to $+1$, this contracts to $\cos \omega_0 \tau$ which is the Doppler frequency signal that is representative of a moving target. When $\tau$ is not equal to T, the filtering or integration which is included in the correlator eliminates the broad spectrum signal.

A target may be located more quickly by first having the switch arm 29 set on a contact point 46, and the switch arm 37 set on a contact point 47. This is the "all range" position of these switch arms for the "all range" mode of operation. The contact point 46 is supplied from a frequency divider 48 with a square wave voltage recurring at 150,000 cycles per second. The divider 48 is driven by the 6 megacycle clock 24.

The contact point 47 is supplied from a frequency divider 49 with a square wave voltage recurring at 300,000 cycles per second. The divider 49 also is driven by the clock 24.

By using the "all range" mode, the operator may quickly determine whether there is a moving target in the direction in which the antenna is pointing and anywhere within the maximum radar range, within 250 meters in this example. The operation of this mode will be explained with reference to the graphs in FIGS. 3 and 4.

Figure 3:
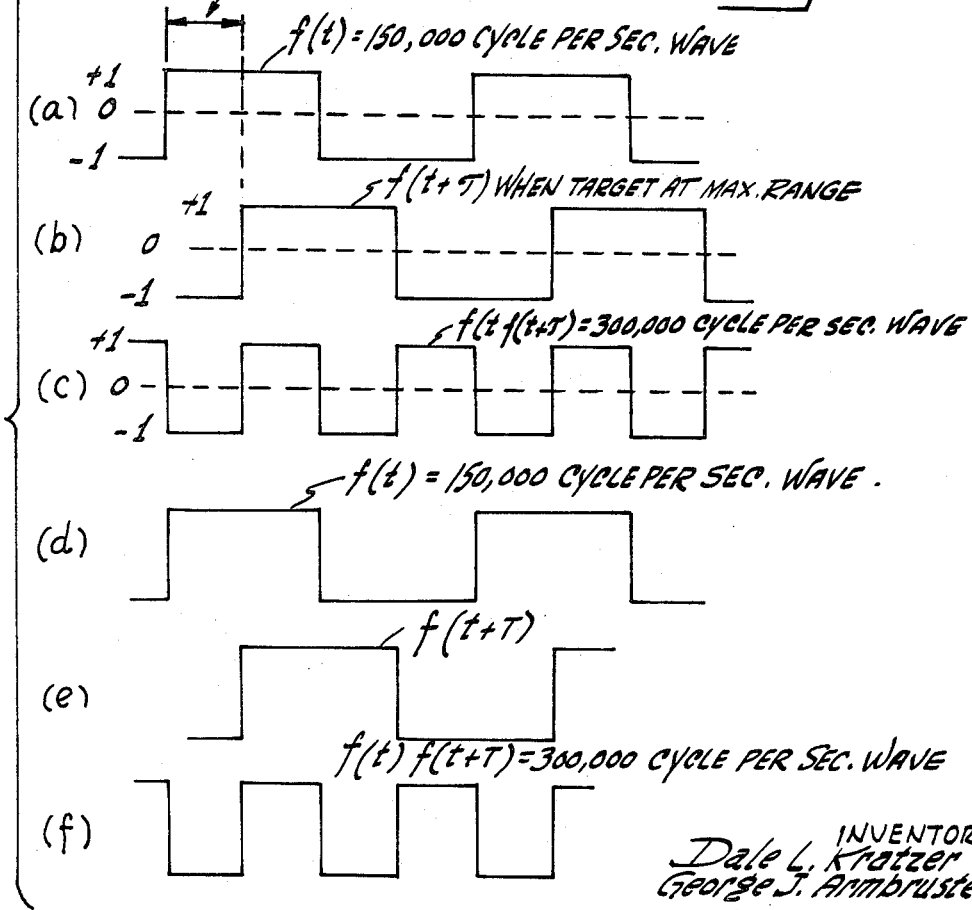

Referring to FIG. 3, graph (a), this is the 150,000 cycles per second square wave which is the code $f(t)$ that phase modulates the carrier wave in the "all range" mode operation. This is a 180 degree phase shift modulation just as in the "range bins" mode. This repetition rate or frequency of the square wave is selected so that the time of one-fourth cycle of wave is equal to the transit time out and back for a target at the maximum range, at 250 meters in this example. Thus, the received reflected signal from such a target is $f(t+\tau)$ and is delayed as indicated by FIG. 3, graph (b). As previously described, and as indicated in FIG. 1, the output of the video amplifier 39 is $f(t)f(t+\tau)$ times the Doppler signal $\cos \omega_0 \tau$. To simplify the graphs in FIGS. 3 and 4, it is assumed that the targets are stationary so that there is no Doppler signal. In FIG. 3, graph (c) is the product of graphs (a) and (b), and thus represents the video amplifier output which is fed into the correlator 38. This same signal should be fed into the correlator over line 35 to obtain complete correlation for signal from a target at maximum range.

Such a signal, which is fed over line 35, is shown in FIG. 3, graph (f). It is the 300,000 cycle per second square wave supplied from frequency divider 49. Referring to FIG. 3, graphs (d) and (e), it will be seen that it corresponds to the product of the code $f(t)$ and the delayed code $f(t+T)$ where $T=\tau$, $\tau$ in this case being the transit time where the target is at maximum range.

This "all range" mode provides a sensitivity time control (STC) effect because the correlation becomes less and less complete as the target gets closer to the radar set. Maximum Doppler signal amplitude is heard when there is complete correlation.

This difference between complete and partial correlation is illustrated in a general way by the graphs of FIG. 4. Refer first to FIG. 4 where graphs (f), (g) and (h) illustrate the complete correlation which occurs when the target is at the 250 meter maximum range. Graph (f) represents the signal fed over line 41 into the correlator from the video amplifier. Graph (g) represents the 300,000 cycle signal fed over line 35 to the correlator, where the delay T equals the delay $\tau$. The product of these two signals (after multiplication by the correlator) is shown by graph (h). Since a stationary target has been assumed, this correlator output is direct current of a certain value indicated as $+1$. The presence of Doppler signal would appear as a variation in the amplitude of this direct current.

Refer next to graphs (a), (b), (c), (d) and (e) of FIG. 4 which illustrate the partial correlation that occurs for a target at 125 meters from the radar set. Graph (c) is the product of the code $f(t)$ shown in graph (a) and the received reflected code $f(t+\tau)$ shown in graph (b). This product signal is fed over the line 41 to the correlator.

The other signal fed to the correlator, by way of line 35, is the 300,000 cycle wave shown by graph (d). The two signals, graphs (c) and (d), fed to the correlator are multiplied in the correlator to give the product signal shown by graph (e). After the filtering or integration occurring in the correlator, the correlator output is a direct current of reduced value as compared with the value when there is the complete correlation illustrated in graph (h). It will be evident that any direct current variation representing Doppler signal cannot be as great in the case of partial correlation, graph (e), as in the case of complete correlation, graph (h), providing the larger direct current amplitude.

In the use of this "all range" mode, the operator will hear a Doppler signal if there is a moving target anywhere within the 250 meter range. Therefore, in this mode the operator swings the antenna until he hears a Doppler signal. He then knows the antenna is pointing to a moving target. He then switches to the "range bins" mode, and moves the tap switch 31 over the taps 1 to 10 until maximum amplitude Doppler signal is heard. The tap on which switch 31 is located is then noted and the corresponding range is read off.

The above-described correlation system whether operating in the "range bins" mode or in the "all range" mode requires no elaborate filtering, such as the use of comb filters, and supplies a substantially noise free Doppler signal to the earphones. The reason for this is that when the repetitive code directly phase modulates the carrier wave to shift its phase 180 degrees as described, the frequency spectrum of the resulting signal consists of frequency components: zero plus target Doppler frequency, code repetition rate plus and minus Doppler frequency, two times code repetition rate plus and minus Doppler frequency, etc. Therefore, this resulting signal consists of frequency components spaced apart by a frequency equal to the code repetition rate minus twice the target Doppler frequency (which in this example is 6000 per second). Thus, in the present example the demodulated carrier applied to the video amplifier has a frequency spectrum having frequency components at the target Doppler frequency, at 6000 cycles per second plus and minus the Doppler frequency, at 12000 cycles per second plus and minus the Doppler frequency, etc. In the present example, the highest frequency Doppler signal to be passed to the earphones is one of 1500 cycles per second. Therefore, by designing the audio amplifier (or by inserting a separate filter) to pass signal from about 30 cycles per second to slightly above 1500 cycles per second, as in this specific example, and to exclude signals in the region of 4500 cycles (6000—1500 cycles) and above, the noise components due to uncorrelated signals, and particularly those due to the code repetition rate, are eliminated.

From the foregoing it will be apparent that not only should the code repetition frequency be higher than the highest Doppler frequency to be utilized, but preferably it should be at least two times said highest Doppler frequency to avoid overlay in the frequency spectrum of the Doppler frequency and the code repetition frequency (6000 in this example) minus the Doppler frequency.

Refer now to the balanced circuit of FIG. 2 which illustrates an embodiment of the present invention for cancelling out any amplitude modulation that may be introduced by the phase modulator 11. A small portion of the transmitted signal is taken off the line 16 by a coupler 56 and fed to a radio frequency attenuator 57 which is adjusted to supply signal of the proper strength to the diode 19b. The diode 19b is connected in polarity opposition to the mixer diode 19a so that the signal appearing across its load resistor 58 is of opposite polarity to that appearing across the load resistor 51 of diode 19a. The resistors 51 and 58 may have a resistance of 220 ohms each, for example.

The signal appearing across load resistor 58 is applied to the upper end of the sum resistor 52. Thus it tends to cancel the corresponding opposite polarity signal applied to the lower end of sum resistor 52. The resistor 52 may have a resistance of 500 ohms, for example.

Referring more specifically to the cancellation operation, and taking certain values by way of example, assume the input power to the circulator by way of conductor 13 is 6 dbm. (Note that zero dbm.=1 milliwatt.) The circular leakage attenuation is about −18 dbm., so that the detected amplitude modulation at the load resistor 51 is −12 dbm.

The transmitted signal picked up by the coupler 56 is attenuated about −14 dbm. by the coupler and the RF attenuator 57 so that the detected amplitude modulation at the load resistor 58 is −8 dbm. Thus, the voltage of the detected amplitude modulation is greater at the top of sum resistor 52 than at the bottom, resulting in an amplitude modulation balancing out position for tap 53 toward the bottom of the resistor 52. This is desired so that the Doppler signal output of mixer diode 19a will pass through a minimum amount of the sum resistor and thus suffer minimum attenuation.

The Doppler signal output of diode 19a is not balanced out by the Doppler signal output of diode 19b because the reflected signal that reaches diode 19b is greatly attenuated (−14 dbm. in this example), whereas the reflected signal reaching diode 19a through the circulator is not attenuated.

It may be noted that the input end of the video amplifier provides a load impedance (of about 1000 ohms in this example) into which the signal from tap 53 feeds. A capacitor 61 connected between the tap 53 and ground functions as an envelope detection filter cooperating with the amplitude detection function of the diodes 19a and 19b.

It will be evident that any amplitude modulation that may be present may be balanced out by adjusting the tap 53 to the proper position.

The specific example of a suitable phase modulator (modulator 11) previously referred to will now be described.

Refer to FIG. 5.

The phase modulator comprises a three port circulator 75, a short transmission line 76 leading from the second port, and a varactor diode 77 that, together with an inductive impedance described later, terminates the transmission line 76. The 9250 mc. input signal from the oscillator 10 (FIG. 1) is applied to the first port through a transmission line 74, in this case a coaxial line.

It is a characteristic of a circulator that improper termination of a port causes reflection of part of the signal into the next port (in the direction of the arrow on the circulator 75). If the termination is reactive, which is the case here where the termination is either inductive or capacitive depending upon the varactor capacity, the energy is completely reflected from the second port to the third port and out the line 13. Also, the change in phase of the reflected signal is a function of the change in the capacity of the terminating varactor 77.

The varactor diode 77 is back-biased sufficiently by a bias voltage source (not shown) so that when the code signal is applied the varactor is back-biased during both the +1 value and the −1 value of the code and, therefore, has a certain capacitive value for each code value. The varactor has one capacity at the +1 code value resulting in a phase shift of one value for the reflected carrier, and it has a different capacity at the −1 code value resulting in a phase shift of a different value for the reflected carrier. These two phase shift values are made to differ by 180 degrees.

In the example being described, the transmission lines 74, 13 and 76 are coaxial lines having a characteristic impedance of fifty ohms. The circulator 75 also has a characteristic impedance of fifty ohms.

The transmission line 76 may be considered to be terminated at the junction point 78 where varactor 77 is connected to the center conductor 79. The length of line 76 (from the circulator to the junction point 78) is not critical. In the present example it is between ⅛ and ¼ wavelength (λ) long, but it may be ½λ or more in length. The wavelength λ is the wavelength of the 9250 mc. carrier.

A coaxial line section 79 extends from the line 76 for the purpose of adding inductance to the termination of line 76. The end of line 79 is short circuited. The point of short circuiting is made adjustable by an adjustable direct-current short circuit connection 81. The coaxial line length from the junction point 78 to the short circuit 81 is less than ¼λ so that the impedance looking into the line section 79 from junction point 78 is inductive.

As described, one side of varactor 77 is connected to the center conductor 79. The other side of the varactor is connected to the center conductor 82 of a coaxial line 83 through which the code signal is fed to the varactor. The code is applied through a direct-current amplifier (not shown), the proper back bias being applied to the varactor. It will be noted that the code is applied to the varactor through the center conductor 82; and through the outer conductor of line 83, the outer conductor of line 79, and through the short 81 and the center conductor of line 79 to the other side of the varactor.

An adjustable alternating-current shorting connection 84 is provided in the line 83. This short is made A-C instead of D-C to avoid shorting out the code signal. The short 84 is positioned so that the line 83 looking into it from the varactor is capacitive. The short 84 is adjusted to a point where it effectively removes the inductance and stray capacity associated with the varactor, i.e., the line capacity provided by the short and the reactance associated with the varactor are made to resonate at 9250 mc.

From the foregoing it will be seen that the line 76 is terminated by both capacity and inductance, the capacity being provided by the varactor 77, and the inductance being provided by the shorted line section 79.

The above-described phase modulator may be adjusted to provide the desired 180 degree phase shift as follows. The code signal with the back bias is adjusted so that at one code value (the +1 code value, for example) the back bias voltage has a selected maximum value so that the varactor has a selected minimum capacitance value, and so that at the other code value (−1 in this example) the varactor has a selected maximum capacitance value. This change in varactor capacity may be in the order of a two to one or a three to one change.

The code signal values corresponding to +1 and −1 are now supplied to the line 83 by manual switching. First the +1 value signal is applied so that the varactor has the selected minimum capacity value. Under this condition, looking into the line 76 from the circulator, the line 76 looks predominately inductive, and the line 76 appears to have a length $L_0$.

Next the −1 value signal is applied so that the varactor has the selected maximum capacity value. Now the line 76 looks predominately capacitive looking into it from the circulator, and the line 76 appears to have a length $L_1$, the length $L_1$ being greater than the length $L_0$. The difference between the lengths $L_0$ and $L_1$ is adjusted until this length difference is exactly ¼λ, thus, providing a 180 degree phase shift since the carrier is reflected, i.e., it passes down the line 76 and back to the second port. Therefore, in this round trip the carrier passes through a length of line that is ½λ greater when the line length is $L_1$ than when it is $L_0$.

This desired difference in the line lengths $L_1$ and $L_0$ is obtained by adjusting the position of the shorting bar 81. The correct position of the short 81 is determined by means of a phase meter connected to the input line 74 and the output line 13. When the phase difference between the input signal and the output signal is shown to be 180 degrees, the adjustment is complete.

In the course of adjusting the D–C short 81 to the correct position, the A–C short 84 usually should also be adjusted. It is known that the A–C short 84 is at its proper position when the D–C short 81 becomes effective so that its adjustment results in the desired 180 degree phase shift.

Phase modulation by the above-described phase-modulator produces little or no amplitude modulation. This is because the 180 degree phase shift is obtained by a varactor capacitor change (such as two or three to one) that is small enough so that the varactor is substantially entirely capacitive in operation, any lossy resistive effects being negligible. It may be noted also that the coaxial lines 76, 79 and 83 have a low internal loss.

What is claimed is:

1. In combination,
means for producing a carrier that is modulated in accordance with a desired function and is also incidentally modulated in accordance with an undesired function,
a receiver mixer,
a transmitting device,
means for supplying said modulated carrier to said transmitting device,
means for supplying to said mixer a portion of said modulated carrier prior to transmission which has been attenuated a certain amount,
means for receiving said modulated carrier after reflection from a target and supplying it to said mixer,
means for picking off some of said modulated carrier prior to transmission and attenuating it,
a detector connected in polarity opposition to said mixer whereby their outputs are in polarity opposition,
means supplying said last-mentioned attenuated signal to said detector,
a summing circuit to which said detector and mixer outputs are supplied whereby the detected undesired modulation is cancelled out at a certain point in said summing circuit,
and means for taking off from said certain point the detected desired modulation.

2. The invention according to claim 1 wherein said last-mentioned attenuated signal is attenuated less than said certain amount.

3. In combination,
means for generating a carrier,
means for modulating said carrier in accordance with a certain function and also unavoidably in accordance with a different undesired function,
an antenna,
a circulator,
means for supplying said modulated carrier through said circulator to said antenna for transmission,
a receiver mixer,
some of said transmitted modulated carrier being supplied to said mixer by way of leakage through said circulator,
means for supplying said modulated carrier after reflection from a target and after being picked up by said antenna through said circulator to said receiver mixer,
means for attenuating some of said modulated carrier prior to transmission,
a detector to which said attenuated modulated carrier is supplied,
said detector being connected in polarity opposition to said receiver mixer whereby its output is in polarity opposition to that of said receiver mixer,
a summing means to which said detector and receiver mixer outputs are applied whereby the detected undesired modulation is cancelled out at a certain point in said summing means,
and means for taking off from said certain point the other detected modulation.

4. In a correlation system,
means for transmitting a phase modulated carrier wave which is also undesirably amplitude modulated,
means for receiving said transmitted wave after reflection from a target,
a mixer diode that squares an applied signal,
means for applying to said mixer diode the sum of said received signal and of an attenuated portion of said modulated carrier prior to transmission whereby there appears at the output of said mixer diode the detected phase modulation and the detected amplitude modulation,
a summing circuit to which the output of said mixer diode is supplied,
a cancellation diode which has its output supplied to said summing circuit, said cancellation diode being connected with its polarity opposite to that of said mixer diode,
means for picking off some of said modulated carrier prior to transmission and attenuating it and then applying it to said cancellation diode whereby there appears at its output the detected amplitude modulation, whereby the detected undesired modulation is cancelled at a certain point in said summing circuit,
and means for taking off from said certain point the detected desired modulation.

5. In a correlation system,
means for transmitting a phase modulated carrier wave which is also undesirably amplitude modulated,
means for receiving said transmitted wave after reflection from a target,
a mixer diode that squares an applied signal,
means for applying to said mixer diode the sum of said received signal and of an attentuated portion of said modulated carrier prior to transmission whereby there appears at the output of said mixer diode the detected phase modulation and the detected amplitude modulation,
a sum resistor to one end of which the output circuit of said mixer diode is connected,
a cancellation diode having its output circuit connected to the other end of said sum resistor, said cancellation diode being connected with its polarity opposite to that of said mixer diode,
means for picking off some of said modulated carrier prior to transmission and attenuating it and then applying it to said cancellation diode whereby there appears at its output the detected amplitude modulation,
and an output tap on said sum resistor located at a position where the amplitude modulation outputs of said two diodes cancel.

No references cited.

RODNEY D. BENNETT, *Primary Examiner.*

J. P. MORRIS, *Assistant Examiner.*